United States Patent [19]

Bates et al.

[11] Patent Number: 5,691,542
[45] Date of Patent: Nov. 25, 1997

[54] EMISSIVITY TARGET THAT PROVIDES POSITIVE AND NEGATIVE DIFFERENTIAL TEMPERATURE PATTERNS RELATIVE TO A BACKGROUND TEMPERATURE

[75] Inventors: Kenn S. Bates, Lakewood; Richard A. James, Long Beach, both of Calif.; Bradley R. Risinger, Ellicott City, Md.

[73] Assignee: Hughes Aircraft, Los Angeles, Calif.

[21] Appl. No.: 680,306

[22] Filed: Jul. 11, 1996

[51] Int. Cl.$^6$ .................................. G01M 11/02
[52] U.S. Cl. ...................... 250/495.1; 250/504 R
[58] Field of Search .............. 250/495.1, 504 R; 273/348.1

[56] References Cited

U.S. PATENT DOCUMENTS 4,263,515  4/1981  Runciman ..................... 250/504 R
4,967,091  10/1990  Fair et al. ...................... 250/495.1

Primary Examiner—Jack I. Berman
Attorney, Agent, or Firm—G S. Grunebach; M. W. Sales; W. K. Denson-Low

[57] ABSTRACT

An electro-optical target comprising an emissivity target and a controlled background source that has a temperature greater than, less than or equal to the temperature of the emissivity target. Appropriate adjustment of the temperatures of the emissivity target and heated controlled background source causes the "apparent" temperature of the emissivity target to be less than the specular ambient or background temperature, effectively emitting a negative temperature (delta T) relative to the background temperature produced by the controlled background source. It is useful to have an electro-optical target that emits a negative temperature (delta T) for minimum resolvable temperature testing of FLIR systems, for example, without cooling any of the components of the electro-optical target.

9 Claims, 1 Drawing Sheet

EMISSIVITY TARGET THAT PROVIDES POSITIVE AND NEGATIVE DIFFERENTIAL TEMPERATURE PATTERNS RELATIVE TO A BACKGROUND TEMPERATURE

BACKGROUND

The present invention relates generally to electro-optical test equipment, and more particularly, to an electro-optical emissivity target that provides both positive and negative target temperatures relative to a background temperature for use with electro-optical test equipment.

The assignee of the present invention designs and manufactures electro-optical test equipment for testing military fire control systems, and the like. Such electro-optical test equipment includes an emissivity target that is imaged by components of electro-optical systems that are tested. The emissivity target is the heart of the electro-optical test equipment. Heretofore, emissivity targets used in electro-optical test equipment have not been designed so that the temperature of the targets could be adjusted above and below a background temperature.

In the prior art, a large, bulky blackbody has typically been used to present a target pattern to an electro-optical system under test at some relative temperature (delta T) that is different from the background. Generally, the relative temperature difference is above the background temperature. However, many prior art blackbodies can cool a blackbody cavity to provide negative temperature differences. However, no known prior art emissivity target has had the ability to provide both positive and negative target temperatures relative to the background temperature.

Prior art emissivity targets typically provide positive apparent temperature differences (delta T's) and not negative apparent temperature differences (delta T's). Reverse patterns can be made in which the target pattern appears lower than the background (i.e., hot bar patterns versus cold bar patterns). However, the same pattern cannot be made to be both hot or cold. This is very important, for example, in an minimum resolvable temperature (MRT) test, which utilizes an operator's ability to notice a feint bar pattern at the edge of his eyes sensitivity range and therefore the operator should be staring at only one location, expecting the target to appear at that location.

Cooling of target elements is relatively costly, is energy inefficient, and requires more components than heating. Emissivity targets have not been implemented to generate negative delta T's because cooling is relatively cost prohibitive. A full depot level MRT test of a forward looking infrared (FLIR) system, for example, normally requires that both positive and negative delta T's be emitted by the target for a complete test. An emissivity target that can provide both positive and negative delta T's, and is not prohibitive to implement would provide an improvement over currently available emissivity targets.

More and more, military customers are making decisions regarding the purchase of electro-optical test systems based upon cost and upon whether such systems perform at levels comparable to full depot level MRT testing equipment. The ability to provide target temperatures that are above and below background temperatures is therefore important to satisfying this need. Therefore, it would be an improvement in the art to have an emissivity target that performs over full depot level test temperature ranges by having the ability to provide target temperatures that are above and below background temperatures.

Accordingly, it is an objective of the present invention to provide for an electro-optical target that provides both positive and negative target temperatures relative to background temperature for use with electro-optical test equipment.

SUMMARY OF THE INVENTION

To meet the above and other objectives, the present invention is an electro-optical target that comprises a emissivity target, and a controlled background source that can have a temperature less than, greater than, or equal to the temperature of the emissivity target. Appropriate adjustment of the temperatures of the emissivity target and heated controlled background source causes the "apparent" temperature of the target pattern to be less than the target background, effectively emitting a negative differential temperature (delta T). It is very useful to have a target emit a negative temperature (delta T) for MRT testing of FLIR systems, for example, without cooling any of the components of the emissivity target.

A full depot level MRT test of a FLIR system normally requires both positive and negative delta T's be emitted for a complete test. The present invention provides for an emissivity target that satisfies this need. The present emissivity target invention emits apparent negative temperature relative to the background temperature (delta T) using a target pattern and can also emit a positive delta T under different heating conditions. It is extremely useful for an emissivity target to emit a negative delta T for MRT testing of FLIR systems without cooling any target components. The present invention provides for an emissivity target that can generate both positive and negative delta T's, and is not costly to implement, and therefore provides an improvement over currently available emissivity targets.

The present emissivity target is relatively small and light, and draws very little current, and utilizes a heated target to provide positive apparent delta T's. The present emissivity target invention provides positive apparent delta T's and negative apparent delta T's wherein reverse bar patterns are made in which the target pattern appears at a lower temperature than the background (i.e., hot bar patterns versus cold bar patterns). This is very important for use in MRT tests that utilize an operator's ability to notice a feint bar pattern at the edge of his eyes sensitivity range. This requires that the operator stare at only one place, where he or she expects the target to appear.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
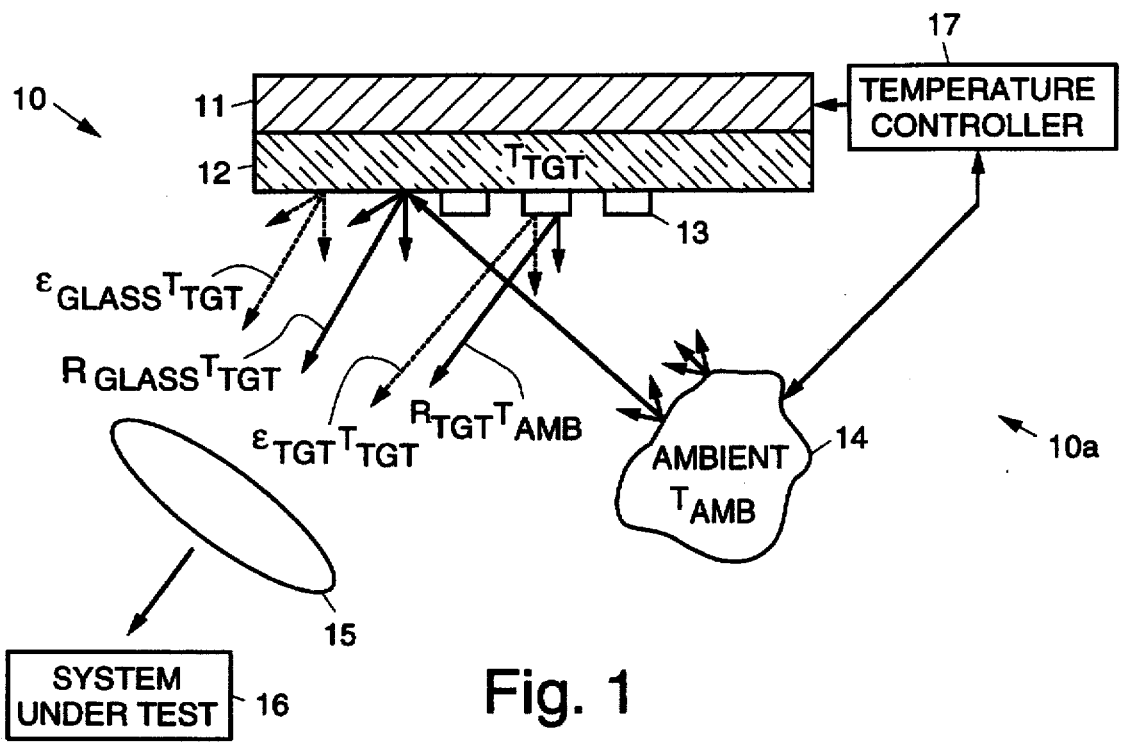
FIG. 1 shows a conventional emissivity target which is improved upon by the present invention.

Referring to the drawing figures, FIG. 1 shows a conventional electro-optical target 10. The conventional electro-optical target 10 comprises a glass backing material 12 or substrate 12 that is disposed on a heater 11. The heated substrate 12 or glass backing material 12 has a coating pattern 13, or target pattern 13, disposed thereon that typically corresponds to any valid target pattern such as those that typically include large bars, four bars of different size and frequency, diagonal bar, small squares, large squares, crosses, corners, filars and bi-filars. The coating pattern 13 is typically a layer of metal film, such as gold or chrome, for example. The heated substrate 12 is heated by the heater 11 under control of a temperature controller 17 and radiates at a target temperature ($T_{TGT}$). An ambient background source 14 radiates energy at an ambient temperature ($T_{AMB}$). The temperature controller 17 measures the ambient temperature. The heated substrate 12, coating pattern 13 and heater 11 form an emissivity target 10a.

Energy is radiated by the heated substrate 12, and reflected thereby, and is collimated by collimating optics 15. The collimating optics 15 may be a collimating lens 15 or a collimating mirror 15. However, for close focusing of a unit or system under test 16, no collimating optics are needed. Energy that is collimated by the collimating optics 15 is directed at and imaged by a unit or system under test 16, such as a forward looking infrared system 16 or other electro-optical system 16. The energy contrast that is ultimately collimated by the collimating optics 15 and imaged by a system under test 16 is a function of the emissivity of the heated target 12 ($\epsilon_{GLASS}$) times the temperature of the heated target 12 ($T_{GLASS}$), the emissivity of the target pattern 13 ($\epsilon_{TGT}$) times the temperature of the heated target 12 ($T_{GLASS}$), the reflective coefficient of the target ($R_{GLASS}$) times the ambient temperature of the ambient background source 14 ($T_{AMB}$), and the reflective coefficient of the target pattern 13 ($R_{GLASS}$) times the ambient temperature of the ambient background source 14 ($T_{AMB}$).

The energy contrast emitted from the heated emissivity target 10a can be derived to be the equation $$\Delta E = (\epsilon_{TGT} - \epsilon_{GLASS}) \rho (T_{TGT}^4 - T_{AMB}^4).$$

Figure 2:
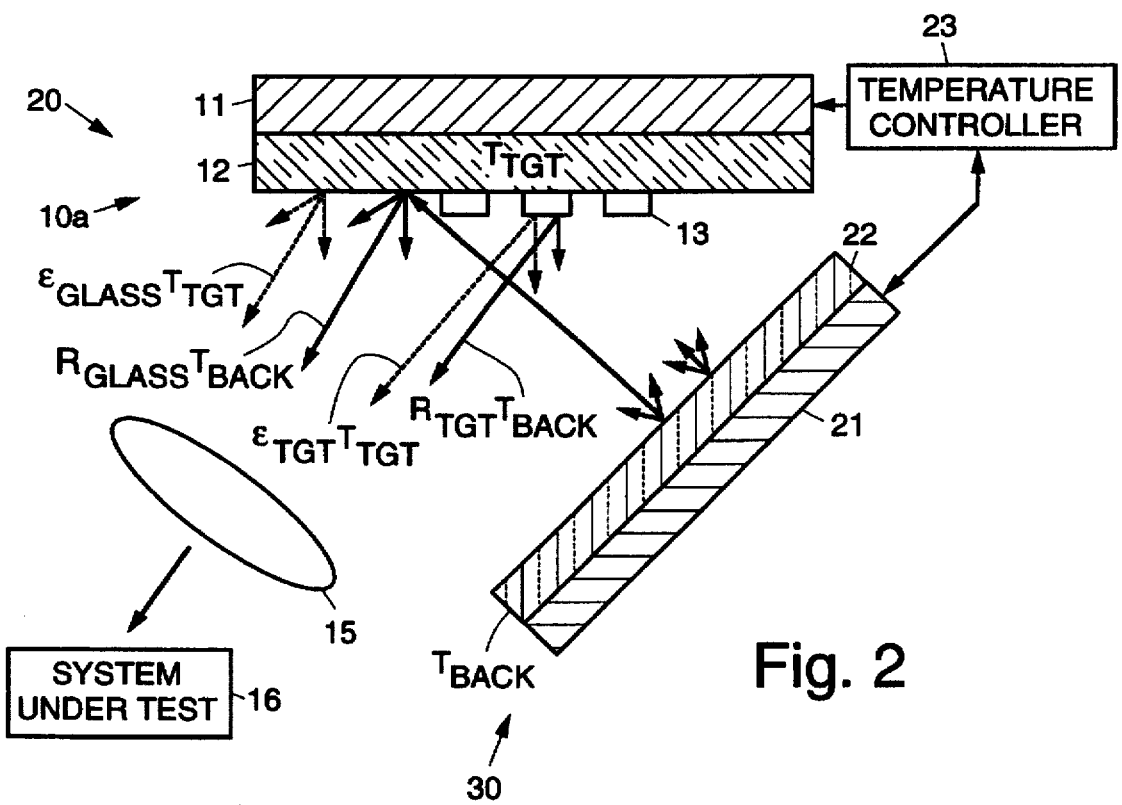
FIG. 2 show shows an emissivity target in accordance with the principles of the present invention.

Referring now to FIG. 2, it shows an electro-optical target 20 in accordance with the principles of the present invention that provides both positive and negative temperature variations (delta T) relative to a selected background temperature. The electro-optical target 20 of the present invention may be referred to as a positive and negative (delta T) emissivity target 20.

The electro-optical target 20 has a heated emissivity target 10a comprising a glass backing material 12 or substrate 12 that is disposed on a heater 11. The substrate 12 or glass backing material 12 has a coating pattern 13, or target pattern 13, disposed thereon that forms a predetermined bar target pattern. The substrate 12 is heated by the heater 11 and radiates at a target temperature ($T_{TGT}$).

In contrast to the conventional electro-optical target 10 that uses the ambient background source 14, the present electro-optical target 20 comprises a controlled heated background source 30 that radiates energy at a controlled background temperature ($T_{BACK}$). The controlled heated background source 30 comprises any material, but is typically painted or coated metal 22 in conjunction with a second heater, or glass flat 22 that is disposed on a second heater 21, or a background chamber 22 that is coupled to a heater 21. A dual temperature controller 23 is used to control both the emissivity target 10a and the controlled heated background source 30.

The electro-optical target 20 of the present invention works using the same principles as the conventional electro-optical target 10. However, the present invention is not subject to the variations that occur in ambient temperature ($T_{AMB}$) of the conventionally used ambient background source 14. Furthermore, the conventional electro-optical target 10 requires heating the emissivity target 10a to a temperature higher that the ambient temperature generated by the ambient background source 14 so that a specific temperature difference (delta T) above ambient temperature is maintained. Under these conditions, with the conventional electro-optical target 10, the system under test 16 would "see" an effective delta T of $\Delta T_{EFF}$. In contrast, the present electro-optical target 20 controls the apparent ambient temperature by using the separately controlled heated background source 30.

The present electro-optical target 20 is substantially the same as the target 10 of FIG. 1 except that it employs the controlled heated background source 30 instead of the ambient background source 14. The energy contrast provided by the present electro-optical target 20 is determined by the equation $$\Delta E = (\epsilon_{TGT} - \epsilon_{GLASS}) \rho (T_{TGT}^4 - T_{BACK}^4),$$

where the ambient temperature ($T_{AMB}$) is replaced with the temperature of the controlled heated background source 30 ($T_{BACK}$).

There are two components of the energy reflected from the emissivity target 10a which includes a diffuse reflective term and a specularly reflective term. To completely control the ambient reflected temperature, one would need to control the temperature of an enclosure surrounding the emissivity target 20. Since most likely, it would not be possible to see infrared energy through walls of such an enclosure, and an emissivity target so enclosed would not be of much use as a target for forward looking infrared systems, and the like.

Therefore, in the present invention, a small hole may be made in the chamber 22 so that infrared energy radiated by the electro-optical target 20 may be imaged onto the system under test 16. The size of the chamber 22 may be scaled down to provide a relatively small background source 30. The chamber 22 is strategically placed so that it specularly reflects its energy off of the emissivity target 10a into the collimating optics 15 and the chamber 22 is appropriately heated to the desired temperature. If it is assumed that specular reflection is much greater than diffuse reflection, then this approximation is good. This is born out by the fact that the emissivity target 20 is basically smooth and shiny and therefore reflects specularly. Also, laboratory experiments have shown this to be true.

The present invention has been reduced to practice to prove out its principles. The electro-optical target 20 has been constructed using only one additional small heated element (comprising the controlled heated background source 30 which includes the background chamber 22 or metal flat 22 that is coupled to the second heater 21) and the dual temperature controller 23 to command its temperature to be higher or lower than that of the temperature of the emissivity target (which is also heated). The emissivity target 20 has the main advantage that it can provide apparent temperature differentials ($\Delta T$s) that are positive or negative relative to the background temperature provided by the controlled heated background source 30. The electro-optical target 20 also has the added advantage that it is much easier to control in environments where ambient temperatures are extreme, such as in frozen wintry climates (such as Alaska) and hot deserts (such as the Middle East), or in environments where the ambient temperature often fluctuates. In addition, by heating the background, the positive $\Delta T$ can be reduced (say from 10° to 2°) much more rapidly than can be accomplished with cooling, particularly if cooling is with respect to ambient temperature. This provides for a quicker response target when this situation arises.

Thus, an electro-optical target that provides both positive and negative target temperatures relative to a background temperature for use with such electro-optical test equipment has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An electro-optical target that radiates spatially differential energy at positive and negative target temperatures relative to a background temperature for use in testing a system under test, said target comprising:

an emissivity target having a predetermined target pattern disposed thereon;

a controlled heated background source that radiates energy at a controlled background temperature; and a dual temperature controller for controlling the respective temperatures of the emissivity target and the controlled background source.

2. The target of claim 1 further comprising:

collimating optics for collimating energy emitted by and reflected from the emissivity target and directing the collimated energy at the system under test.

3. The target of claim 1 wherein the emissivity target comprises a glass substrate that is disposed on a heater.

4. The target of claim 1 wherein the target pattern comprises a predetermined pattern.

5. The target of claim 2 wherein the target pattern comprises a predetermined pattern.

6. The target of claim 1 wherein the controlled background source comprises a metal backing material that is coupled to a heater.

7. The target of claim 1 wherein the controlled background source comprises a background chamber that is coupled to a heater.

8. The target of claim 2 wherein the collimating optics comprises a collimating lens.

9. The target of claim 2 wherein the collimating optics comprises a collimating mirror.

* * * * *